United States Patent
Karnik et al.

(10) Patent No.: US 9,506,397 B2
(45) Date of Patent: Nov. 29, 2016

(54) EXHAUST PRESSURE ESTIMATION FROM WASTEGATE MOTOR CURRENT

(71) Applicant: Ford Global Technologies, LLC, Dearborn, MI (US)

(72) Inventors: Amey Y. Karnik, Mumbai (IN); Yan Wang, Ann Arbor, MI (US); Vladimir V. Kokotovic, Bloomfield Hills, MI (US); James Alfred Hilditch, Canton, MI (US); Allan Roy Gale, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 895 days.

(21) Appl. No.: 13/725,250

(22) Filed: Dec. 21, 2012

(65) Prior Publication Data

US 2014/0174073 A1  Jun. 26, 2014

(51) Int. Cl.
| | | |
|---|---|---|
| *F02B 37/18* | (2006.01) | |
| *F02D 41/14* | (2006.01) | |
| *F02D 41/40* | (2006.01) | |
| *F02D 13/02* | (2006.01) | |
| *F02D 41/00* | (2006.01) | |

(52) U.S. Cl.
CPC ........... *F02B 37/18* (2013.01); *F02D 13/0261* (2013.01); *F02D 41/0085* (2013.01); *F02D 41/145* (2013.01); *F01N 2560/08* (2013.01); *F02D 41/005* (2013.01); *F02D 41/0007* (2013.01); *F02D 41/1445* (2013.01); *F02D 41/40* (2013.01); *F02D 2041/001* (2013.01); *Y02T 10/144* (2013.01); *Y02T 10/18* (2013.01)

(58) Field of Classification Search
CPC .. F02B 37/18; F02D 41/0085; F02D 41/145; F02D 13/0261; F02D 41/1445; F02D 41/40; F02D 41/0007; F02D 41/005; F02D 2041/001; Y02T 10/144; F01N 2560/08
USPC .......................................................... 60/602
See application file for complete search history.

(56) References Cited

U.S. PATENT DOCUMENTS

| | | | | |
|---|---|---|---|---|
| 6,012,289 | A * | 1/2000 | Deckard et al. ................ 60/602 |
| 2011/0023481 | A1* | 2/2011 | Baeuerle ........................ 60/602 |
| 2011/0314807 | A1* | 12/2011 | Karnik et al. ................... 60/602 |
| 2012/0216534 | A1* | 8/2012 | Werstat et al. ................. 60/611 |
| 2012/0303239 | A1* | 11/2012 | Kalweit et al. ............... 701/102 |
| 2013/0283782 | A1* | 10/2013 | McConville et al. .......... 60/603 |

OTHER PUBLICATIONS

Hilditch, James Alfred et al., "Twin Turbocharger Wastegate Control," U.S. Appl. No. 13/725,438, filed Dec. 21, 2012, 30 pages.

* cited by examiner

*Primary Examiner* — Nicholas J Weiss
*Assistant Examiner* — Paul Thiede
(74) *Attorney, Agent, or Firm* — Julia Voutyras; Alleman Hall McCoy Russell & Tuttle LLP

(57) ABSTRACT

In one embodiment, a method for an engine comprises adjusting an engine operating parameter based on exhaust pressure, the exhaust pressure estimated based on wastegate actuator motor current.

20 Claims, 4 Drawing Sheets

EXHAUST PRESSURE ESTIMATION FROM WASTEGATE MOTOR CURRENT

FIELD

The present disclosure relates to an internal combustion engine.

BACKGROUND AND SUMMARY

Turbocharged engines are configured to compress ambient air entering the engine in order to increase power. A wastegate may control the amount of exhaust energy provided to the turbine of a turbocharger, thereby affecting boost pressure. Changes in wastegate position affect the exhaust pressure, which in turn affect engine breathing. Because of a lack of low-cost, reliable exhaust manifold pressure sensors, the exhaust pressure is often estimated in an engine controller to assist the speed-density calculations for estimating engine flow.

Typically, the exhaust pressure is estimated based in part on wastegate position. Traditional pneumatic wastegates lack position measurement, and thus wastegate position may be estimated using a force balance between the pneumatic, the spring, and the exhaust forces. However, the inventors herein have recognized that such wastegate position estimation may result in significant variability in the exhaust pressure estimation, leading to inaccurate engine air flow determinations.

Accordingly, a method is provided to at least partly address the above issues. In one embodiment, a method for an engine comprises adjusting an engine operating parameter based on exhaust pressure, the exhaust pressure estimated based on wastegate actuator motor current.

In this way, exhaust pressure may be estimated from the amount of current drawn by the motor of an electrical wastegate actuator. The current of the wastegate actuator motor may be proportional to the exhaust forces acting on the wastegate, and thus the motor current may provide an accurate mechanism for estimating the exhaust pressure and thus the engine breathing.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

In boosted engines, electronic wastegate actuators may provide precise output to achieve delivery of a desired boost to the engine. The output of an electric actuator may be a function of the current supplied to the actuator motor and the magnetic field generated by its magnets, if present. The force produced by an electric actuator may be a function of its magnetic flux multiplied by the current flowing through its windings (hereinafter referred to as "motor current"). Thus, the actuator motor current is proportional to the force acting on the wastegate by the exhaust. By measuring the motor current over time, an average exhaust pressure may be estimated. The estimated exhaust pressure may be used to determine the engine air charge, estimate the turbine power, adjust fuel injection quantity, determine if a particulate filter soot load has reached a regeneration threshold, and other parameters.

If the camshaft timing has been set to include positive valve overlap, the use of average exhaust pressure in calculation of engine air charge may not be fully accurate, as the exhaust pressure during the valve overlap period may be different than the exhaust pressure during non-overlap periods. The exhaust pressure during the valve overlap period may be determined by using motor current measurements. Specifically, the sampling of the motor current may be timed to measure the current during the overlap period, as well as times between the valve events. Using these measurements, the exhaust pressure may be determined during the valve overlap period. The exhaust pressure during overlap can then be used to provide a more accurate air charge estimation rather than using only the average exhaust pressure.

Figure 1:
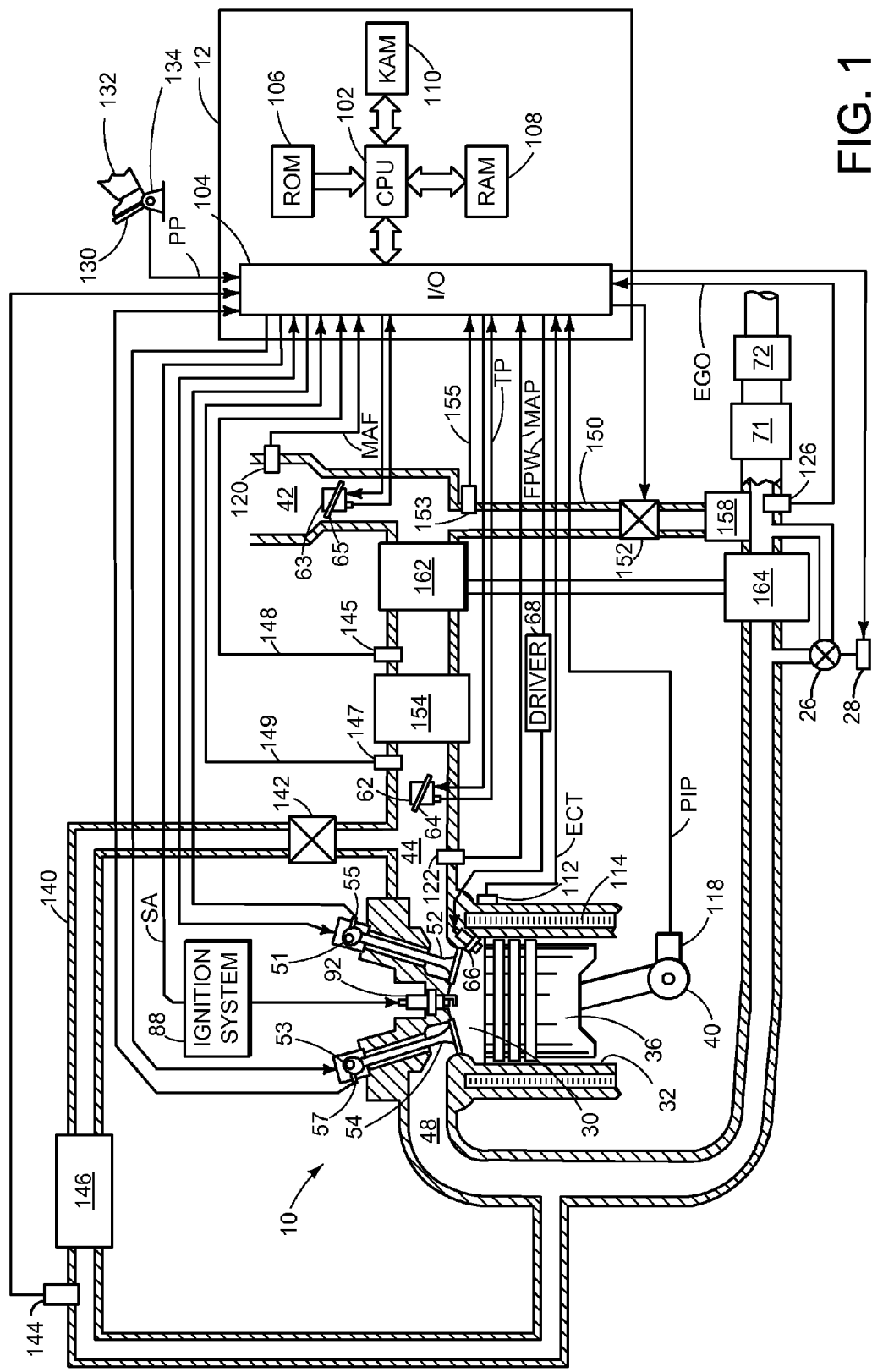
FIG. 1 shows a schematic depiction of an engine.

An example engine including a turbocharger and electrically-actuated wastegate is depicted in FIG. 1. The engine also includes a controller configured to carry out the method depicted in FIG. 2 according to the map depicted in FIG. 3.

Referring now to FIG. 1, it shows a schematic diagram of one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 and may exhaust combustion gases via exhaust passage 48. Intake manifold 44 is supplied via intake passage 42. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Engine 10 may further include a compression device such as a turbocharger including at least a compressor 162 arranged upstream of intake manifold 44. For a turbocharger, compressor 162 may be at least partially driven by a turbine 164 (e.g., via a shaft) arranged along exhaust passage 48. Thus, the amount of compression provided to one or more cylinders of the engine via a turbocharger may be varied by controller 12. Further, exhaust passage 48 may include wastegate 26 for diverting exhaust gas away from turbine 164. Wastegate 26 may be operated with an actuator 28, which, for example, may be an electric actuator including permanent magnets. In some embodiments, actuator 28 may be an electric motor. Wastegate 26 and/or a compressor bypass valve (not shown in FIG. 1) may be controlled by controller 12 via actuators (e.g., actuator 28) to be opened when a lower boost pressure is desired, for example.

A charge air cooler 154 may be included downstream from compressor 162 and upstream of intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Further, in the disclosed embodiments, an exhaust gas recirculation (EGR) system may route a desired portion of exhaust gas from exhaust passage 48 to intake manifold 44. FIG. 1 shows an HP-EGR system and an LP-EGR system, but an alternative embodiment may include only an LP-EGR system, or only an HP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_X$, HC, or CO sensor.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_X$ trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1).

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque (through airflow estimates). Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
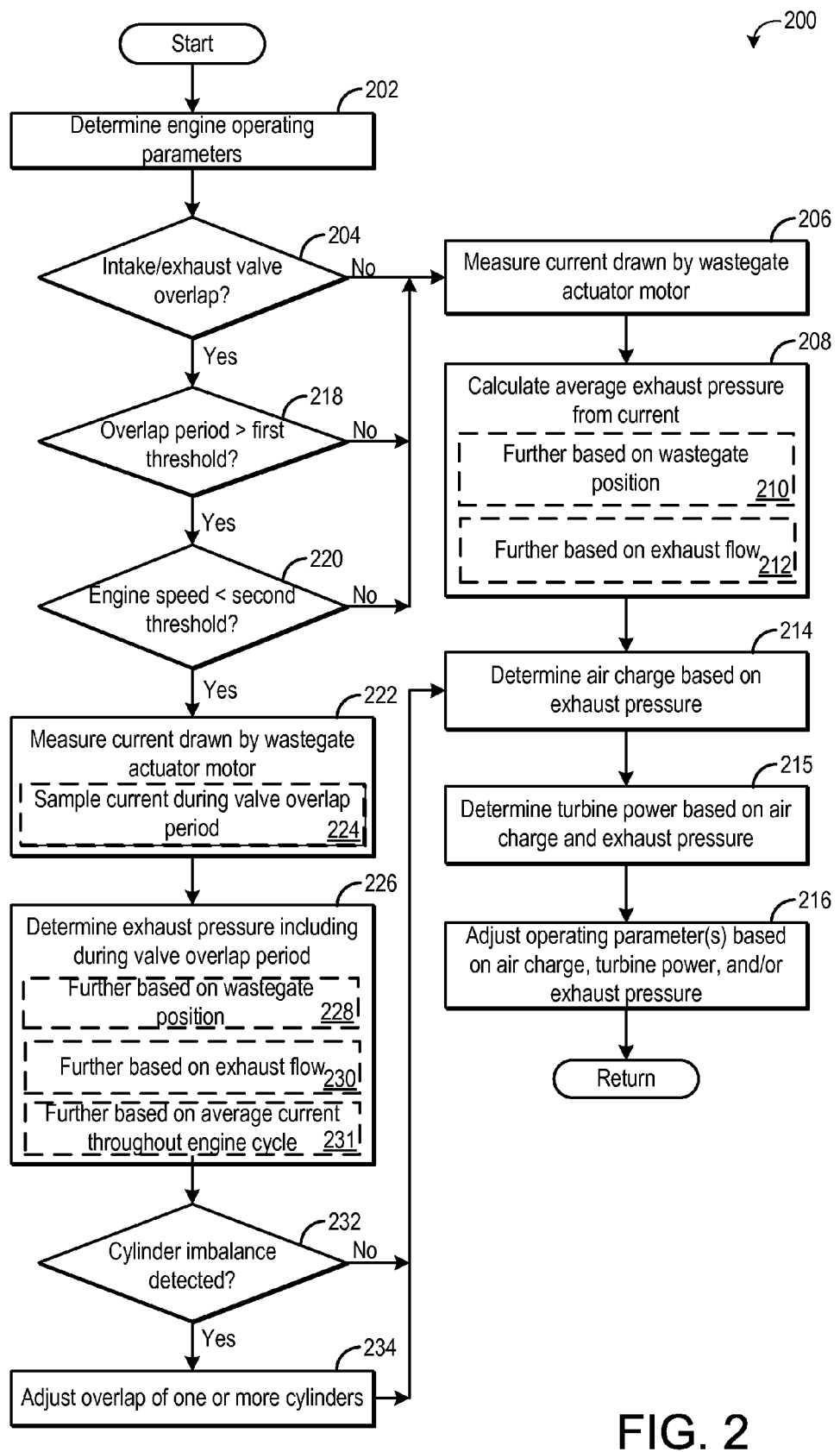
FIG. 2 shows a flow chart illustrating an example method for estimating exhaust pressure.

Turning now to FIG. 2, a method 200 for determining exhaust pressure is illustrated. Method 200 may be carried out by controller 12 according to instructions stored thereon. Method 200 may determine the exhaust pressure from an engine based on current from a wastegate actuator motor, for example based on current drawn from electric wastegate actuator 28 of FIG. 1.

At 202, engine operating parameters are determined. The engine operating parameters may include, but are not limited to, engine speed and load, intake manifold pressure, exhaust flow, exhaust temperature, air-fuel ratio, camshaft position, valve timing, and other parameters. At 204, it is determined if the engine is operating with intake and exhaust valve overlap. During valve overlap, the exhaust valve and intake valve of a given cylinder may be open at the same time for a portion of the engine cycle. For example, the exhaust valve closing timing may be delayed and/or the intake valve opening time may be advanced such that the exhaust valve is closing as the opening of the intake valve commences, resulting in a period of overlap where both valves are open.

As a result, there are two things that can happen. One possibility is that the amount of exhaust remaining in the cylinders during combustion (referred to as internal EGR) may be increased, improving engine efficiency and reducing emissions during some conditions. This occurs when the pressure in the exhaust during overlap is greater than the pressure inside the cylinder. This trapping of the air affects the air charge.

The other possibility when the exhaust valve is open during a portion of the time when the intake valve opens, is that some of the intake air drawn into the cylinder may be immediately expelled out to the exhaust system, further affecting the exhaust pressure. This effect is also known as scavenging, and affects the relationship between airflow trapped inside the engine and the total airflow through the engine. This effect is a function of the exhaust pressure during overlap.

The calculated average exhaust pressure may not correlate well with the exhaust pressure during overlap. As a result, if the wastegate actuator motor current is sampled arbitrarily with respect to valve timing, it may not accurately reflect the exhaust pressure during overlap.

Thus, if it is determined at 204 that the engine is operating with valve overlap, method 200 proceeds to 218, which will be explained below. If the engine is not operating with valve overlap, method 200 proceeds to 206 to measure the current drawn by the wastegate actuator. The motor current may be measured, for example, with a current probe or sensor. Alternatively, the current may be calculated based on Ohm's law as the ratio of actuator voltage (e.g., terminal voltage) and actuator resistance, if these two quantities are known or can be measured and when a resistance/temperature lookup table is available. The current drawn by the wastegate actuator (otherwise referred to as the motor current) may be measured periodically over a given duration of time, for example it may be measured 10 times every engine cycle, once every millisecond, etc., for one second or 10 engine cycles or other suitable time duration. The motor current may then be averaged to provide an average current over the given duration.

Figure 3:
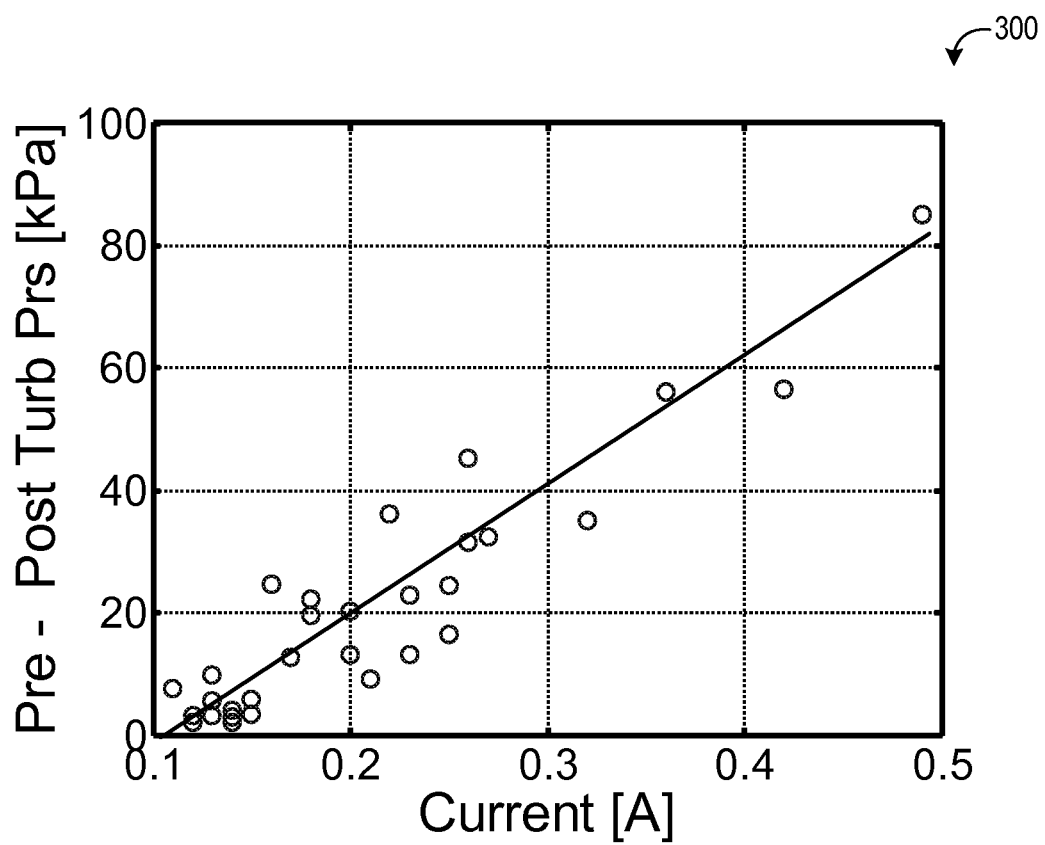
FIG. 3 shows a map correlating wastegate actuator motor current to turbine pressure.

At 208, an average exhaust pressure is determined based on the average motor current. As the exhaust pressure fluctuates due to the exhausting of combustion gases following each engine combustion event, the average exhaust pressure over the given duration may be calculated to provide a more stable representation of the overall exhaust pressure. The motor current signal may or may not be filtered when determining the average motor current. The average current drawn by the wastegate actuator corresponds to the force the wastegate exerts to overcome the average exhaust forces. Therefore, the actuator current can be translated into the pressure difference across the turbine. FIG. 3 shows an example map 300 of turbine pressure difference vs. actuator current. The vertical axis is the difference between pre-turbine and post-turbine pressure. Map 300 may be stored in the memory of the controller, and used to look up the turbine pressure difference for a given average current. As shown by map 300, the pressure difference across the turbine increases proportionally to the change in wastegate actuator current. The exhaust pressure can then be estimated from the turbine pressure difference and the measured or estimated post-turbine pressure.

The exhaust pressure may be determined based on additional operating parameters. For example, as indicated at 210, the exhaust pressure may be estimated based on actuator motor current and further based on wastegate position. The inclusion of the wastegate position provides improved flexibility to account for changes in linkage angles and the wastegate poppet surface orientation with wastegate position, which may not be reflected in the exhaust pressure determination with the motor current.

The wastegate position may be determined in a suitable manner. In one example, the wastegate position may be determined based on the wastegate motor. In an example, a sensor may measure linear displacement of a rod actuated by the motor. Alternatively, the motor may include a rotary encoder housed internally in the motor. The encoder may be coupled to the slowest rotating element in the motor which is coupled to an actuating rod. Such an encoder may collect measurements across the entire range through which the element rotates, which may be for example 180 degrees. In this case, the output of the encoder varies as the motor rotates. In another example, the motor includes a screw (e.g., a ball screw), the rotation of which may be measured and used to determine the position of the wastegate valve. However, a different positional encoder may be used, as the ball screw or other rotating element may rotate through a range greater than 180 and/or 360 degrees. Various suitable encoders may be used which, for example, detect changes in angular position as opposed to absolute position.

In other examples, as indicated at 212, the exhaust pressure may be estimated based on motor current and further based on exhaust flow. The inclusion of exhaust flow provides flexibility to account for gas dynamics due to change in flow directions around the wastegate poppet valve. Exhaust flow may be determined by a sensor in the exhaust, may be estimated based on intake mass flow and combustion conditions, or by other suitable mechanisms.

At 214, the engine air charge is determined based on the average exhaust pressure calculated at 218. The air charge may be a function of the intake manifold pressure and the exhaust pressure. At 215, the turbine power is determined based on the air charge and exhaust pressure. Turbine power may describe the power output by the turbine, and in one example may be based on the torque applied to the shaft of the turbocharger and the angular velocity of the shaft. Turbine power may be calculated based on the pressure ratio across the turbine, which may be used to calculate the torque applied to the shaft by the turbine, and thus the turbine power. Based on the engine air charge, turbine power, and/or exhaust pressure, various engine operating parameters may be adjusted at 216. Example operating parameters that may be adjusted include fuel injection quantity, fuel injection timing, EGR valve position, throttle position, spark timing, wastegate position, etc. For example, to maintain a desired air-fuel ratio, the amount of fuel injected to the engine may be adjusted based on the engine air charge. In another example, a desired EGR rate may be maintained by adjusting the position of an EGR valve, such as the LP-EGR valve and/or HP-EGR, based on the engine air charge. Further, the exhaust pressure determined at 208 may be used to adjust various operating parameters. For example, if the exhaust pressure is greater than a threshold, it may indicate that the soot load on a particulate filter in the exhaust passage has reached a threshold level. The controller may then initiate a regeneration of the particulate filter. In another example, the difference between the exhaust pressure and intake manifold pressure, along with the EGR valve position, may dictate how much EGR actually flows to the engine; the position of the EGR valve may be adjusted based on the exhaust pressure to maintain a desired amount of EGR at the engine. In another example, as explained above, the turbine power may be determined, and the wastegate position may be adjusted based on the turbine power. For example, if the turbine power is less than a desired turbine power, the wastegate may be moved to a more closed position.

Returning to 204, if it is determined that the engine is operating with valve overlap, method 200 proceeds to 218 to determine if the valve overlap period is greater than a first threshold. The valve overlap period may include a period of time in which both the exhaust valve and intake valve for a given cylinder are open. As explained above, during valve overlap, the exhaust pressure may differ from the pressure without valve overlap. However, if the valve overlap period is relatively small (e.g., less than the first threshold), the effect on the exhaust pressure may be minimal. The threshold overlap period may be a suitable threshold below which minimal effect on the overall exhaust pressure is observed, such as five degrees crank angle. Thus, if the valve overlap period is less than a first threshold, method 200 proceeds back to 206 to measure the wastegate motor current and calculate the exhaust pressure without regard for the valve timing events, as explained above. If the valve overlap period is greater than or equal to the first threshold, method 200 proceeds to 220 to determine if the engine speed is less than a second threshold.

If the engine speed is relatively high (e.g., greater than the second threshold), it may not be possible to accurately sample the motor current specifically during the valve overlap period. The second threshold may be a suitable engine speed, such as 2000 RPMs. If the engine speed is greater than or equal to the second threshold, sampling during the valve overlap period may be inaccurate, so method 200 proceeds back to 206, as explained above. If the engine speed is below the second threshold, method 200 proceeds to 222 to measure the current drawn by the wastegate actuator motor. This measurement may be similar to the measurement explained above at 206. However, this measurement also includes, at 224, sampling the current during the valve overlap period. The current sampling may be a profile ignition pickup (PIP) based sampling of the actuator current, which provides more localized information related to the exhaust pressure during valve overlap. The sampling during the overlap period may be performed such that the motor current is sampled once every combustion event near top dead center, such as over the 150-180° C. A duration, or at intake valve opening. Additionally, motor current may be sampled during other times of the engine cycle. This sampling results in more representative air charge calculations during the valve overlap period. Additional detail about sampling the motor current during the valve overlap period is presented below with respect to FIG. 4.

At 226, the exhaust pressure during the valve overlap period is determined based on the average current sampled during the valve overlap period. The exhaust pressure may be further modified using information from current sampled at other portions of the engine cycle to adjust for other pressure wave propagation effects, sensor dynamics and dynamic effect of pressure parts of engine cycle. The exhaust pressure during overlap determined at 226 may be determined in a similar manner to the average exhaust pressure determined at 208. For example, as indicated at 228, the exhaust pressure may be determined based on the current during overlap and further based on wastegate position. Also, as indicated at 230, the exhaust pressure during overlap may be determined based on the average current and further based on exhaust flow. Also, as indicated at 231, the exhaust pressure during overlap may be determined based on the current during overlap and further based on average current over the engine cycle.

At 232, it is determined if a cylinder air charge imbalance is detected. The cylinder air charge imbalance may be indicated if the exhaust pressure during the valve overlap period for each cylinder is not equal. For example, the motor current sampled during the valve overlap period for each cylinder may be stored, and the exhaust pressure during the overlap periods determined. If the exhaust pressure from one cylinder is different than the exhaust pressure from the other cylinders (e.g., if the exhaust pressure differs by more than 5%), it may be determined that a cylinder is out of balance. For example, the intake and/or exhaust valve timing may not be optimally set for the imbalanced cylinder, resulting in differential exhaust flow through the cylinder as compared to other cylinders in the engine.

If a cylinder imbalance is detected, method 200 proceeds to 234 to adjust the valve overlap of the imbalanced cylinder. This may include adjusting exhaust and/or intake valve closing timing, exhaust and/or intake valve lift, etc. Method 200 then proceeds to 214 to determine the air charge and/or turbine power from the exhaust pressure, as explained above. Similarly, if a cylinder imbalance is not detected at 232, method 200 also proceeds to 214 to calculate air charge and/or turbine power. As explained previously, one or more operating parameters may be adjusted based on the air charge and/or turbine power at 216. Method 200 then returns.

Thus, method 200 determines an average exhaust pressure by sampling wastegate actuator motor current periodically during one or more engine cycles. If the engine is operating with valve overlap, the timing of the sampling of the motor current may be set to correspond to the valve overlap period. That is, at least one sample of the motor current per engine cycle may be synchronous with an intake valve opening event of a given cylinder.

Figure 4:
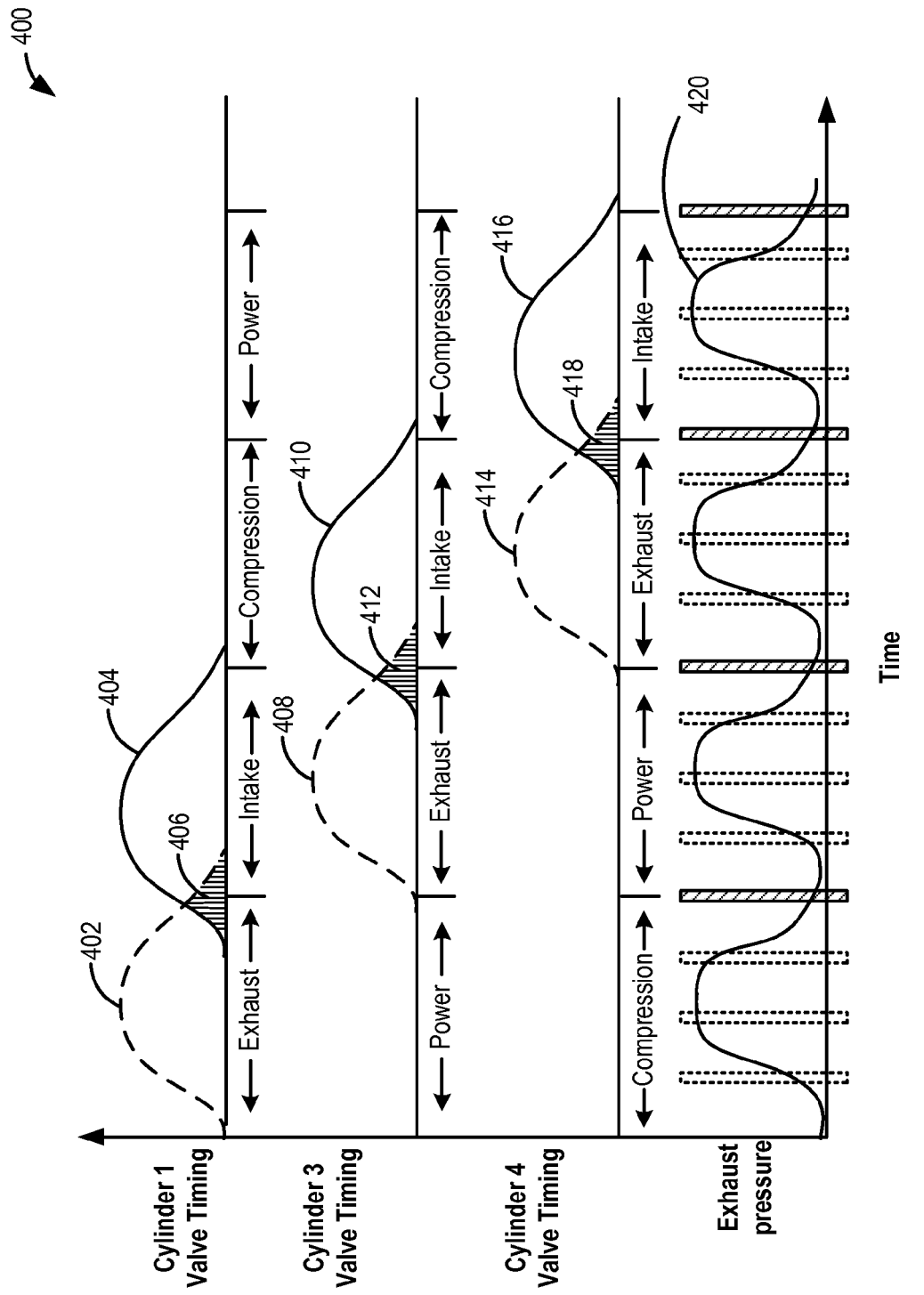
FIG. 4 shows a map illustrating valve timing events and exhaust pressure according to an embodiment of the present disclosure.

FIG. 4 is a map 400 depicting example valve timing events for a plurality of cylinders and engine exhaust pressure. In the example depicted in FIG. 4, the valve timing events for three cylinders of a four cylinder engine are illustrated (cylinders 1, 3, and 4), assuming an engine firing order of 1-3-4-2 (cylinder 2 is not illustrated in FIG. 4). However, it is to be understood that other engine arrangements are possible, such as six-cylinder engines.

Curves 402 and 404 depict valve timings for an exhaust valve (dashed curve 402) and an intake valve (solid curve 404) for cylinder 1 during normal engine operation at part load. As illustrated, an exhaust valve may be opened near the time that the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 406 (or simply, valve overlap), represented by a hatched region at the intersection of curves 402 and 404. In one example, the valve overlap 406 may be a default cam position of the engine.

Curves 408 and 410 depict valve timings for an exhaust valve (curve 408) and an intake valve (curve 410) of cylinder 3. The valve overlap for cylinder 3 is illustrated by valve overlap 412. Curves 414 and 416 depict valve timings for an exhaust valve (curve 414) and an intake valve (curve 416) of cylinder 4. The valve overlap for cylinder 4 is illustrated by valve overlap 418.

During each exhaust event, exhaust is expelled to the exhaust manifold, raising the exhaust pressure. Thus, the exhaust pressure may pulsate as each exhaust valve opens. As such, to determine an overall exhaust pressure, the motor current of the wastegate actuator may be sampled periodically, and the average motor current used to calculate the average exhaust pressure. Further, because the engine is operating with intake and exhaust valve overlap, the sampling of the motor current may be timed to overlap with the valve overlap period.

Curve 420 illustrates exhaust pressure in the exhaust manifold and/or exhaust passage downstream of the manifold. The dashed boxes indicate periods of time in which the wastegate motor current is sampled to calculate the average exhaust pressure. Additionally, the hatched-line boxes are motor current samples that overlap with the valve overlap periods of the cylinders. Thus, as shown in FIG. 4, the motor current is sampled four times every exhaust event, with one motor current sample per exhaust event being taken during the valve overlap period. The samples during the overlap period may be timed equally with the other samples of the motor current, as shown, or may be additional samples that are not necessarily timed equally with the other samples.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   estimating, via an electronic controller, exhaust pressure of exhaust gas from the engine based on motor current of an actuator of a wastegate sampled at a first timing;
   detecting, via the electronic controller, cylinder imbalance of the engine based on motor current of the actuator of the wastegate sampled at a second timing, the second timing adjusted relative to the first timing;
   adjusting a first actuator via the electronic controller to adjust intake and/or exhaust valve timing of intake and/or exhaust valves of the engine when the cylinder imbalance is detected; and
   adjusting a second actuator via the electronic controller to adjust an engine operating parameter of the engine based on the estimated exhaust pressure.

2. The method of claim 1, wherein the exhaust pressure is further estimated based on exhaust flow of exhaust gas from the engine.

3. The method of claim 1, wherein the exhaust pressure is further estimated based on a position of the wastegate.

4. The method of claim 1, wherein adjusting the engine operating parameter further comprises adjusting a fuel injection amount.

5. The method of claim 1, wherein adjusting the engine operating parameter further comprises adjusting a position of an exhaust gas recirculation valve.

6. The method of claim 1, wherein the estimated exhaust pressure is an average estimated exhaust pressure determined by measuring motor current of the actuator of the wastegate over one or more engine cycles of the engine to determine an average motor current, and determining the average estimated exhaust pressure based on the average motor current.

7. The method of claim 1, wherein the second timing includes a valve overlap period of the intake and/or exhaust valves of the engine, and wherein the cylinder imbalance is detected based on the estimated exhaust pressure during the valve overlap period, the estimated exhaust pressure during the valve overlap period estimated based on the motor current sampled at the second timing.

8. The method of claim 7, wherein the first timing comprises periodic sampling at even increments of time over one or more engine cycles of the engine, and the method further comprising using an average motor current of the actuator of the wastegate over one or more engine cycles of the engine to adjust the exhaust pressure during the valve overlap period.

9. An engine system comprising:
a turbocharger including a turbine coupled to a compressor;
a wastegate actuated by an electric actuator coupled across the turbine; and
a controller including instructions to:
determine an amount of current drawn by the electric actuator;
estimate an exhaust pressure acting on the wastegate based on the current; and
adjust an operating parameter of the engine system based on the estimated exhaust pressure.

10. The system of claim 9, further comprising an engine, and wherein the controller includes instructions to determine the amount of current drawn by the electric actuator one or more times per engine cycle of the engine in order to estimate an average exhaust pressure.

11. The system of claim 10, further comprising intake and exhaust valves coupled to the engine to control cylinder air charge into and out of the engine, and wherein the controller includes instructions to determine the amount of current drawn by the electric actuator during a valve overlap period of the intake and exhaust valves.

12. The system of claim 11, wherein the controller includes instructions to indicate a cylinder imbalance of the engine based on the amount of current drawn by the electric actuator during the valve overlap period.

13. The system of claim 12, wherein the controller includes instructions to adjust intake and/or exhaust valve timing of the intake and/or exhaust valves if the cylinder imbalance is indicated.

14. The system of claim 9, wherein the operating parameter includes a position of the wastegate.

15. A method for an engine, comprising:
estimating, via an electronic controller, exhaust pressure of exhaust gas from the engine based on an average motor current of an actuator of a wastegate; and
actuating the actuator of the wastegate via a command from the electronic controller to adjust a position of the wastegate based on the estimated exhaust pressure.

16. The method of claim 15, wherein estimating the exhaust pressure further comprises estimating the exhaust pressure during a valve overlap period of intake and exhaust valves of the engine.

17. The method of claim 16, wherein estimating the exhaust pressure during the valve overlap period further comprises sampling motor current of the actuator during a period corresponding to when an intake valve opens.

18. The method of claim 15, wherein adjusting the position of the wastegate based on the estimated exhaust pressure further comprises estimating turbine power of a turbine based on the estimated exhaust pressure and adjusting the position of the wastegate based on the turbine power.

19. The method of claim 15, wherein the exhaust pressure is further estimated based on exhaust flow of exhaust gas from the engine.

20. The method of claim 15, wherein the exhaust pressure is further estimated based on the position of the wastegate.

* * * * *